United States Patent
Emmanuel et al.

(10) Patent No.: US 9,622,098 B2
(45) Date of Patent: *Apr. 11, 2017

(54) BEACON DETECTION STRUCTURES, SYSTEMS AND PROCESSES FOR INTERFERENCE TESTING

(71) Applicant: NETGEAR, INC., San Jose, CA (US)

(72) Inventors: Joseph Amalan Arul Emmanuel, Cupertino, CA (US); Jonathan M. Hummel, Indio, CA (US); Shahrokh M. Zardoshti, Pleasanton, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,902

(22) Filed: Mar. 2, 2015

(65) Prior Publication Data
US 2015/0172945 A1 Jun. 18, 2015

Related U.S. Application Data

(63) Continuation of application No. 13/710,197, filed on Dec. 10, 2012, now Pat. No. 8,989,244.

(51) Int. Cl.
*H04W 24/08* (2009.01)
*H04W 24/06* (2009.01)
*H04W 88/06* (2009.01)

(52) U.S. Cl.
CPC ........... *H04W 24/08* (2013.01); *H04W 24/06* (2013.01); *H04W 88/06* (2013.01)

(58) Field of Classification Search
CPC ...... H04W 88/06; H04W 24/08; H04W 24/06
See application file for complete search history.

(56) References Cited

U.S. PATENT DOCUMENTS 6,662,009 B2    12/2003  Lynn
7,912,164 B2     3/2011  Armstrong et al.
(Continued)

FOREIGN PATENT DOCUMENTS

CN    101166135 A    4/2008
CN    101529951 A    9/2009
WO    2009046516 A1  4/2009

OTHER PUBLICATIONS

IEEE Standards Department, Draft Recommended Practice for the Evaluation of 802.11 Wireless Performance; IEEE P802.1 Itm/D0.10, copyright 2005, 2006, 180 Pages.*

(Continued)

*Primary Examiner* — Sophia Vlahos
(74) *Attorney, Agent, or Firm* — Perkins Coie LLP

(57) ABSTRACT

A receiver is provided that receives signals from a device under test (DUT) for one or more modes of operation. For each mode, the system detects beacon transmission signals from the DUT, and counts the number of beacons for a period of time. If the count is not consistent with an expected count, e.g. a stored value, the system may preferably provide an output to indicate that there is a problem with the DUT. If the count is consistent with the expected count, the system may preferably perform further testing for other modes of operation. If the count output of the DUT is consistent with expected counts over each of the operation modes, the system may provide an indication that the DUT has passed the beacon tests.

21 Claims, 7 Drawing Sheets

(56) References Cited

U.S. PATENT DOCUMENTS

| | | | |
|---|---|---|---|
| 7,925,253 B2 | 4/2011 | Breit et al. | |
| 8,019,886 B2 | 9/2011 | Harrang et al. | |
| 8,743,705 B2 | 6/2014 | Holman et al. | |
| 8,989,244 B2* | 3/2015 | Emmanuel | H04W 24/06 324/76.16 |
| 2002/0091966 A1 | 7/2002 | Barton et al. | |
| 2005/0015716 A1* | 1/2005 | Lavoie | G06Q 40/02 715/255 |
| 2007/0243826 A1 | 10/2007 | Liu | |
| 2008/0076353 A1* | 3/2008 | Rofougaran | H04B 1/59 455/41.2 |
| 2008/0108352 A1* | 5/2008 | Montemurro | H04W 36/30 455/437 |
| 2008/0153423 A1* | 6/2008 | Armstrong | H04W 24/06 455/67.14 |
| 2010/0285753 A1 | 11/2010 | Foegelle | |
| 2011/0084887 A1 | 4/2011 | Mow et al. | |
| 2011/0230143 A1 | 9/2011 | Lundstrom et al. | |
| 2011/0263215 A1 | 10/2011 | Asplund et al. | |
| 2012/0039178 A1 | 2/2012 | Holman et al. | |
| 2012/0100813 A1 | 4/2012 | Mow et al. | |
| 2012/0231744 A1 | 9/2012 | Gregg et al. | |
| 2012/0244818 A1 | 9/2012 | Kyosti et al. | |
| 2013/0027256 A1 | 1/2013 | Guo et al. | |
| 2013/0257454 A1 | 10/2013 | Mow et al. | |

OTHER PUBLICATIONS

"AMS-8700 MIMO OTA Test System", ETS-Lindgren; retrieved online on Nov. 30, 2012 from url: https://www.ets-lindgren.com/MIMOWirelessTestSystem, 2 pages.

Azimuth Systems, "MIMA OTA Test, Over-the-Air Test: Real World Performance Measurement", retrieved online on Nov. 30, 2012 from url: http://www.azimuthsystems.com/products/rpm/, 2 pages.

Mlinarsky, F., "Test MIMO Wi-Fi and LTE radios over the air", Wireless Test; www.tmworld.com; Test & Measurment World, Mar. 28, 2012, 3 pages.

Rohde & Schwarz, "R&S TS8991 OTA Performance Test System;2012", retrieved online on Nov. 30, 2012 at url: http://www2.rohde-schwarz.com/en/products/test_and_measurement/mobile_radio/TS8991-%7C-Overview-%7C-100-%7C-6539.html, unknown, 2 pages.

Satimo, "StarMIMO-HU", retrieved online on Nov. 30, 2012 at http://www.satimo.com/content/products/starmimo-hu, unknown, 1 page.

"IEEE Draft Recommended Practice for the Evaluation of 802.11 Wireless Performance", IEEE Standards Department, Mar. 26, 2008, 7 pages.

* cited by examiner

BEACON DETECTION STRUCTURES, SYSTEMS AND PROCESSES FOR INTERFERENCE TESTING

BACKGROUND OF THE INVENTION

Technical Field

The invention relates generally to testing structures and processes for wireless or RF (radio frequency) communications systems. More particularly, the invention relates to test structures and processes for the determination of interference between wireless signals.

Description of the Background Art

It is necessary to equip receivers, transmitters, and transceivers with antennas that efficiently radiate, i.e. transmit and/or receive desired signals to/from other elements of a network to provide wireless connectivity and communication between devices in a wireless network, such as in a wireless PAN (personal area network), a wireless LAN (local area network), a wireless WAN (wide area network), a cellular network, or virtually any other radio network or system.

Cable gateways and wireless routers commonly comprise a plurality of radios, e.g. two radios, such as comprising a first, e.g. cable modem radio, and a second, e.g. Wi-Fi radio, wherein the radios operate with different frequencies. However, the sub-harmonic or harmonic frequencies of a first radio, e.g. a cable modem radio, may land upon the frequency band of a second radio, e.g. within a 2.4 GHz or 5.0 GHz band of a Wi-Fi band, thus potentially causing interference between the signals.

While tests of the performance of each of the radios for a cable gateway or router may readily be performed during development or manufacture, individual testing of radio performance does not detect overlap, i.e. interference, between bands.

It would therefore be advantageous to provide a structure and process that readily detects interference between two or more radio bands. The development of such a structure, system and process would provide a significant technical advance.

SUMMARY OF THE INVENTION

A testing structure and system are provided that receives signals from a device under test (DUT) for one or more modes of operation. For each mode, the system detects beacon transmission signals from the DUT, and counts the number of beacons, i.e. pulses, for a period of time. If the count is not consistent with an expected count, e.g. a stored value, the system may preferably provide an output to indicate that there is a problem with the DUT. If the count is consistent with the expected count, the system may preferably perform further testing of other modes of operation. If the count output of the DUT is consistent with expected counts over an operation mode, the system may provide an indication that the DUT has passed the corresponding beacon test. During product development, failure during beacon testing may preferably be remedied or otherwise addressed, and the device, e.g. a prototype, or an alternate device, may be retested, to determine if interference between bands has been eliminated.

DETAILED DESCRIPTION OF THE INVENTION

Figure 1:
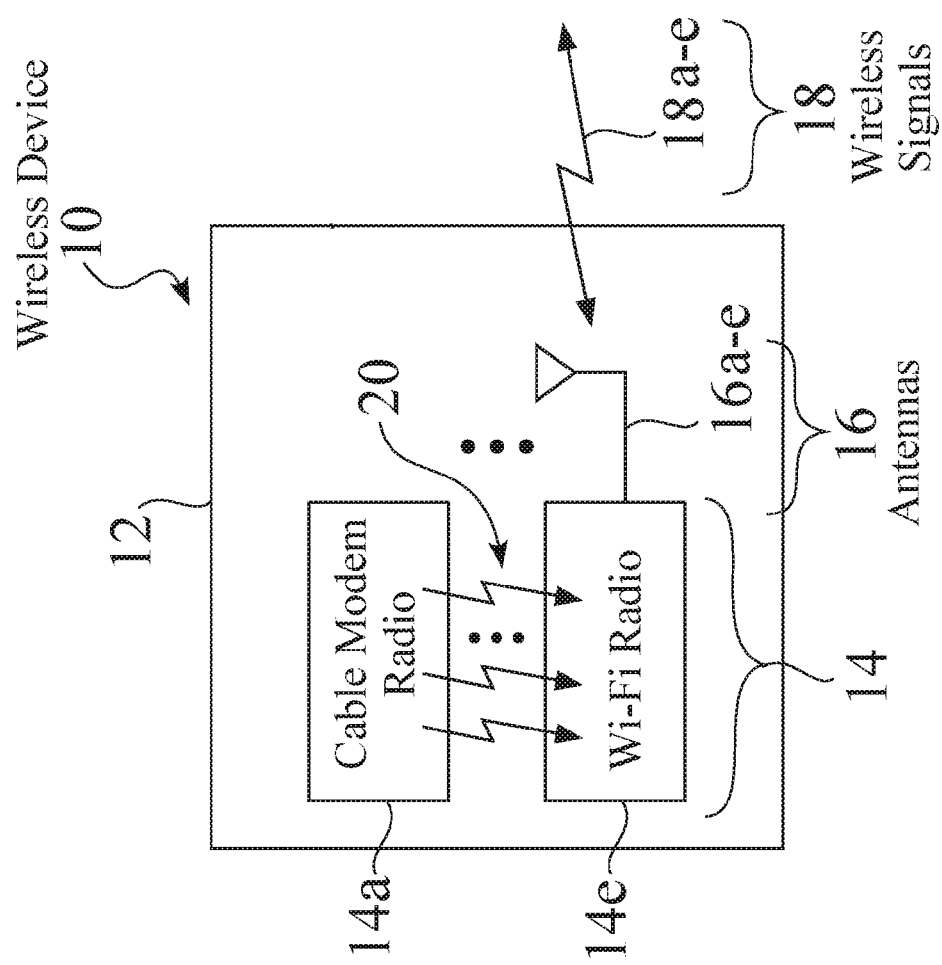
FIG. 1 is a schematic view of an exemplary wireless device to be tested.

FIG. 1 is a partial schematic view of an exemplary wireless device 10, e.g. such as but not limited to a cable gateway or wireless router 10. The exemplary device 10 seen in FIG. 1 comprises an enclosure 12, a plurality of radio modules 14, e.g. 14a-14e, and a corresponding plurality of antennas 16, e.g. 16a-16e, for sending and/or receiving corresponding wireless signals 18, e.g. 18a-18e.

The first exemplary radio module 14a seen in FIG. 1 comprises a cable modem module 14a, while the second exemplary radio module 14e seen in FIG. 1 comprises a Wi-Fi radio module 14e.

While the radio modules 14a and 14e are typically configured to operate with different frequencies, the sub-harmonic or harmonic frequencies of a first radio 14a, e.g. a cable modem radio 14a, may land upon the frequency band of a second radio 14e, e.g. within a 2.4 GHz or 5.0 GHz band of a Wi-Fi band, which may result in interference 20 between the two signals 18a,18e.

While tests of the performance of each of the radio modules 14 for a cable gateway or router may readily be performed during design, development or manufacture, individual testing of radio performance for the modules 14 does not detect overlap, i.e. interference, between bands. Therefore, even if a wireless device passes such individual tests, the device may not work as expected during one or more operating modes, due to interference between wireless bands.

Figure 5:
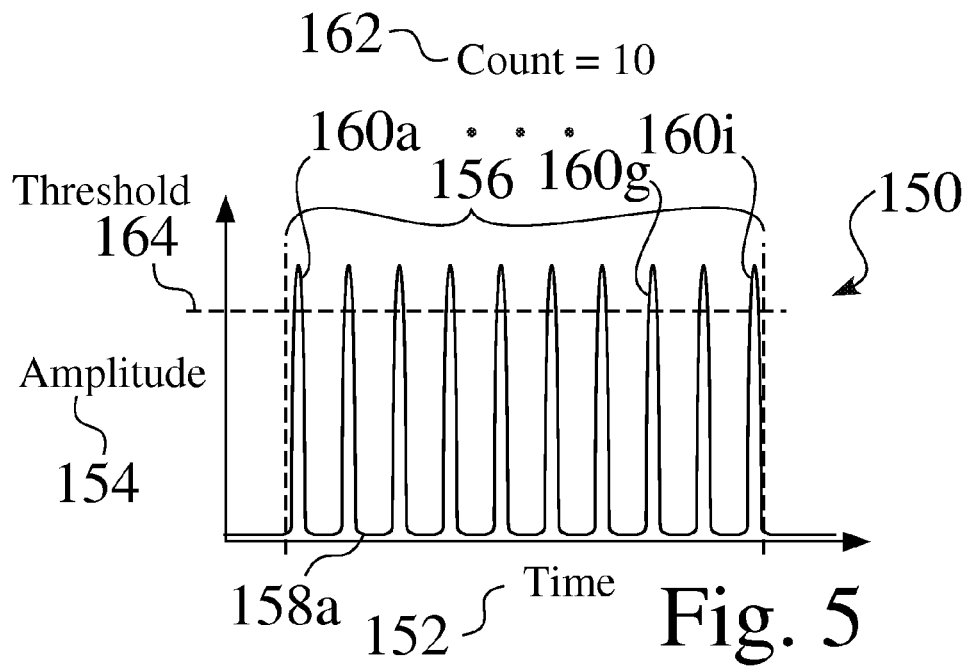
FIG. 5 is a first chart that shows a received wireless transmission from a DUT, and an exemplary beacon count for a time period that is consistent with an expected count.

For example, a wireless signal 18 typically comprises a periodic series of beacons 160, e.g. 160a-160i (FIG. 5, FIG. 6), such as having a beacon interval 172 (FIG. 6), through which packets of information are transmitted from the device 10. If the wireless signal 18 is corrupted or otherwise modified due to interference 20, the resultant transmission signal 158, e.g. 158b (FIG. 6), may lose one or more of the beacons 160. For example, beacon 160g of a received transmission 158a seen in FIG. 5 is missing from the received transmission 158b seen in FIG. 6.

Figure 2:
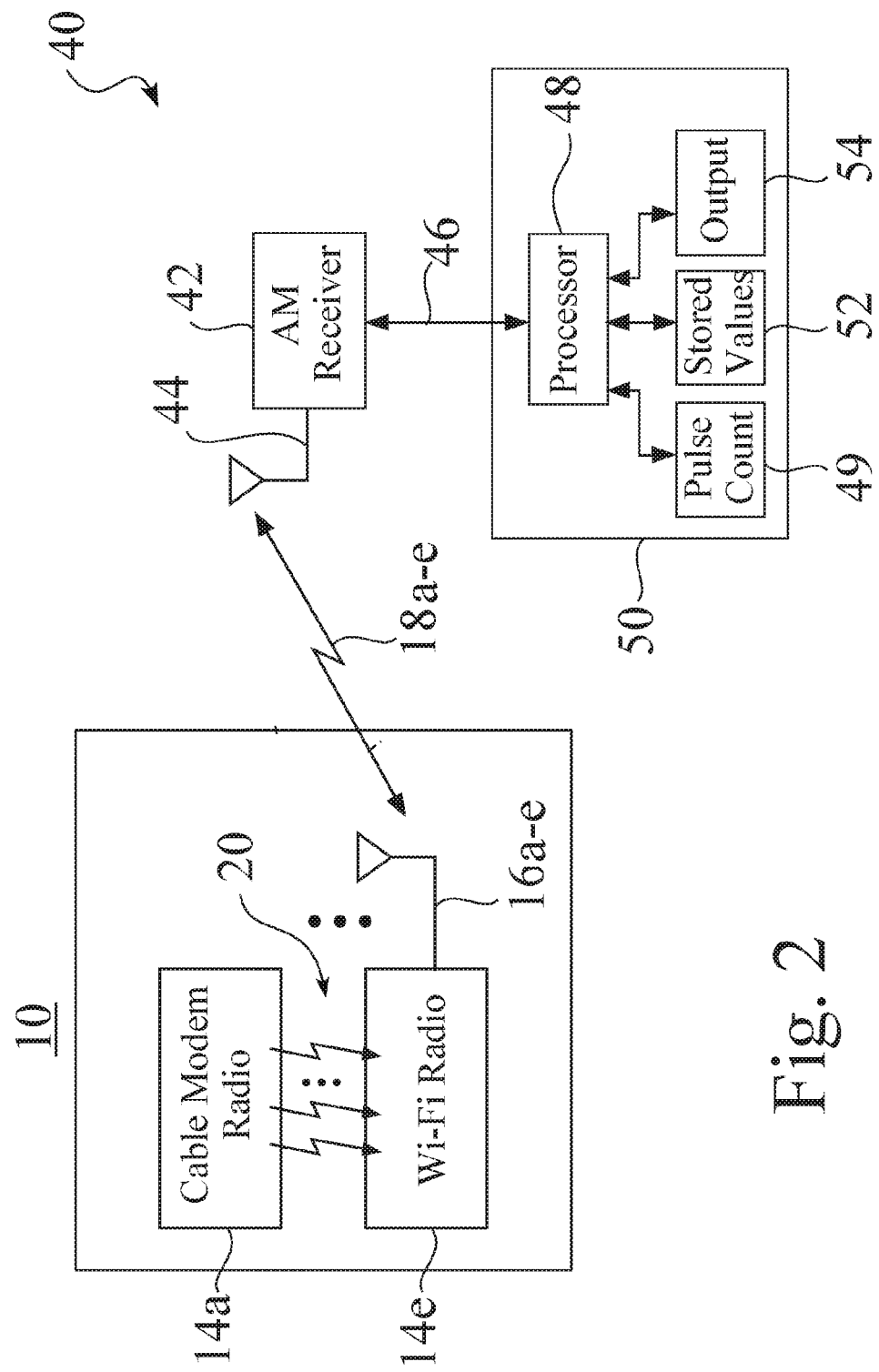
FIG. 2 is a schematic diagram of an exemplary system for beacon testing of a device under test (DUT)

FIG. 2 is a schematic diagram of an exemplary structure 40 for beacon testing of a device under test (DUT) 10. As seen in FIG. 2, radio signals 18, e.g. 18a, 18e may preferably be transmitted during testing 100 (FIG. 4) from a device under test (DUT) 10. The wireless signals 18 are received by a receiver 42, e.g. an amplitude modulation (AM) receiver 42, through an appropriate transmitter 44.

An exemplary AM receiver 42 may typically correspond to medium wave (MW) signals having a range from 535 kHz to 1705 kHz, such as corresponding to the current North American MW broadcast band. An alternate exemplary AM receiver 42 my preferably correspond to medium wave (MW) signals having a range from 526.5 kHz to 1606.5 kHz, such as corresponding to the current European MW broadcast band. Other specific AM receivers 42 may preferably be used, such as configured to receive all the beacons, i.e. pulses 160 over the intended frequency ranges of all the radio modules 18a-18e.

As seen in FIG. 2, wireless signals 18, e.g. 18a, 18e, that are received at the receiver 42 are input to a processor 48 associated with a test system 50, which may preferably be used to detect the presence of interference between radio bands, such as through the use of pulse counts 49 and comparison to stored or expected values 52. The processor 48 may preferably provide an output 54 that corresponds to the results of the counts of beacons 160, and the presence of any interference 120 between radio bands 18.

Figure 3:
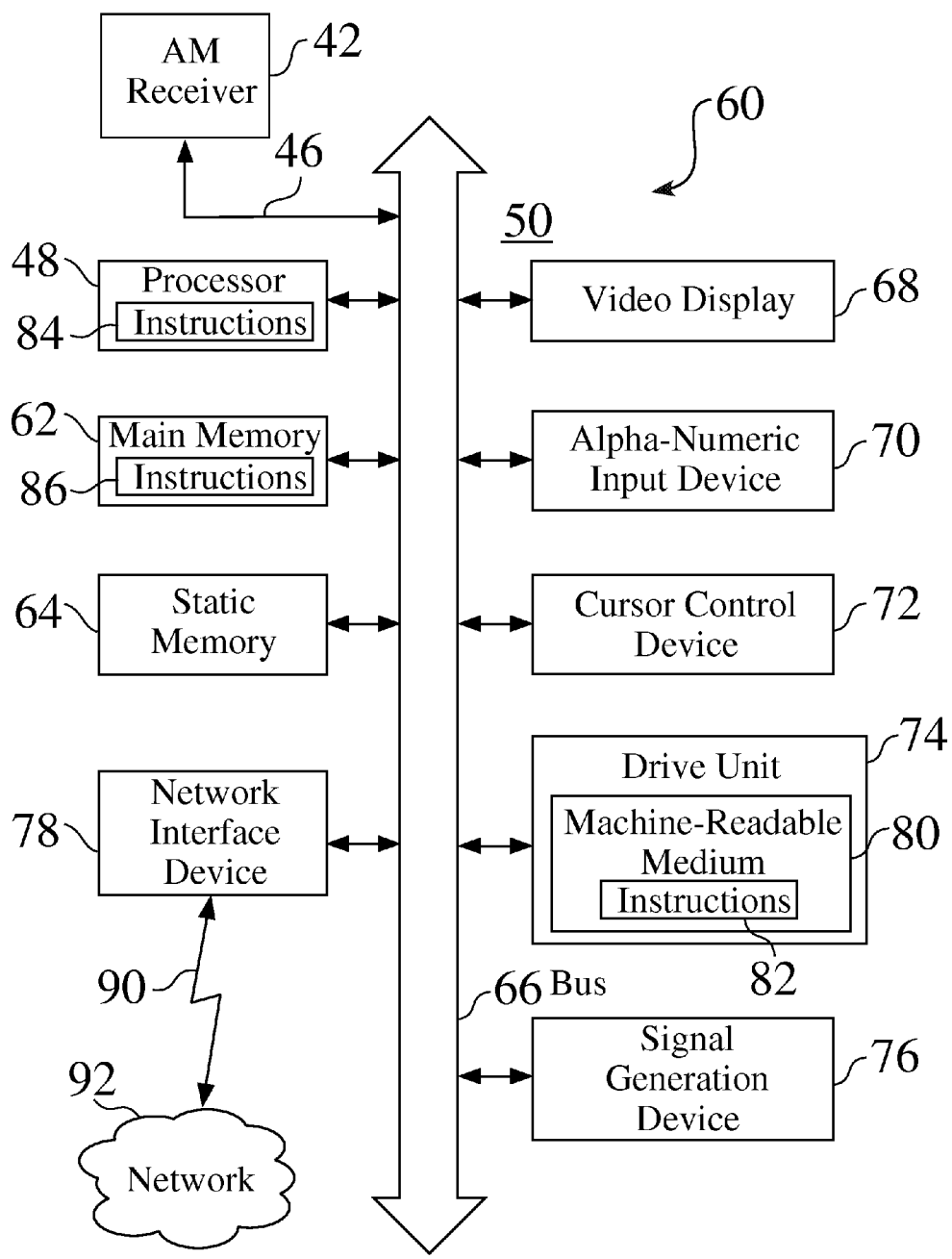
FIG. 3 is a schematic diagram of an exemplary receiver and processing system for beacon detection for interference testing.

FIG. 3 is a block schematic diagram 60 of a machine in the exemplary form of a computer system 50 within which a set of instructions may be programmed to cause the machine to execute the logic steps of the enhanced beacon detection for interference testing system 50. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The exemplary computer system 50 seen in FIG. 3 comprises a processor 48, a main memory 62, and a static memory 64, which communicate with each other via a bus 66. The computer system 50 may further comprise a display unit 68, for example, a light emitting diode (LED) display, a liquid crystal display (LCD) or a cathode ray tube (CRT). The exemplary computer system 50 seen in FIG. 3 also comprises an alphanumeric input device 70, e.g. a keyboard 70, a cursor control device 72, e.g. a mouse or track pad 72, a disk drive unit 74, a signal generation device 76, e.g. a speaker, and a network interface device 78.

The disk drive unit 74 seen in FIG. 3 comprises a machine-readable medium 80 on which is stored a set of executable instructions, i.e. software 82, embodying any one, or all, of the methodologies described herein. The software 82 is also shown to reside, completely or at least partially, as instructions 84,86 within the main memory 62 and/or within the processor 48. The software 82 may further be transmitted or received 90 over a network 92 by means of a network interface device 78.

In contrast to the exemplary enhanced beacon detection for interference testing system 50 discussed above, an alternate enhanced beacon detection for interference testing system 50 or node 50 may preferably comprise logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core, e.g. such as the CPU of a computer, or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing computations with virtual, i.e. cloud computing. For the purposes of discussion herein, cloud computing may mean executing algorithms on any network that is accessible by internet-enabled devices, servers, or clients and that do not require complex hardware configurations, e.g. requiring cables, and complex software configurations, e.g. requiring a consultant to install. For example, embodiments may provide one or more cloud computing solutions that enable users, e.g. users on the go, to print using dynamic image gamut compression anywhere on such internet-enabled devices, servers, or clients. Furthermore, it should be appreciated that one or more cloud computing embodiments include printing with dynamic image gamut compression using mobile devices, tablets, and the like, as such devices are becoming standard consumer devices.

Figure 4:
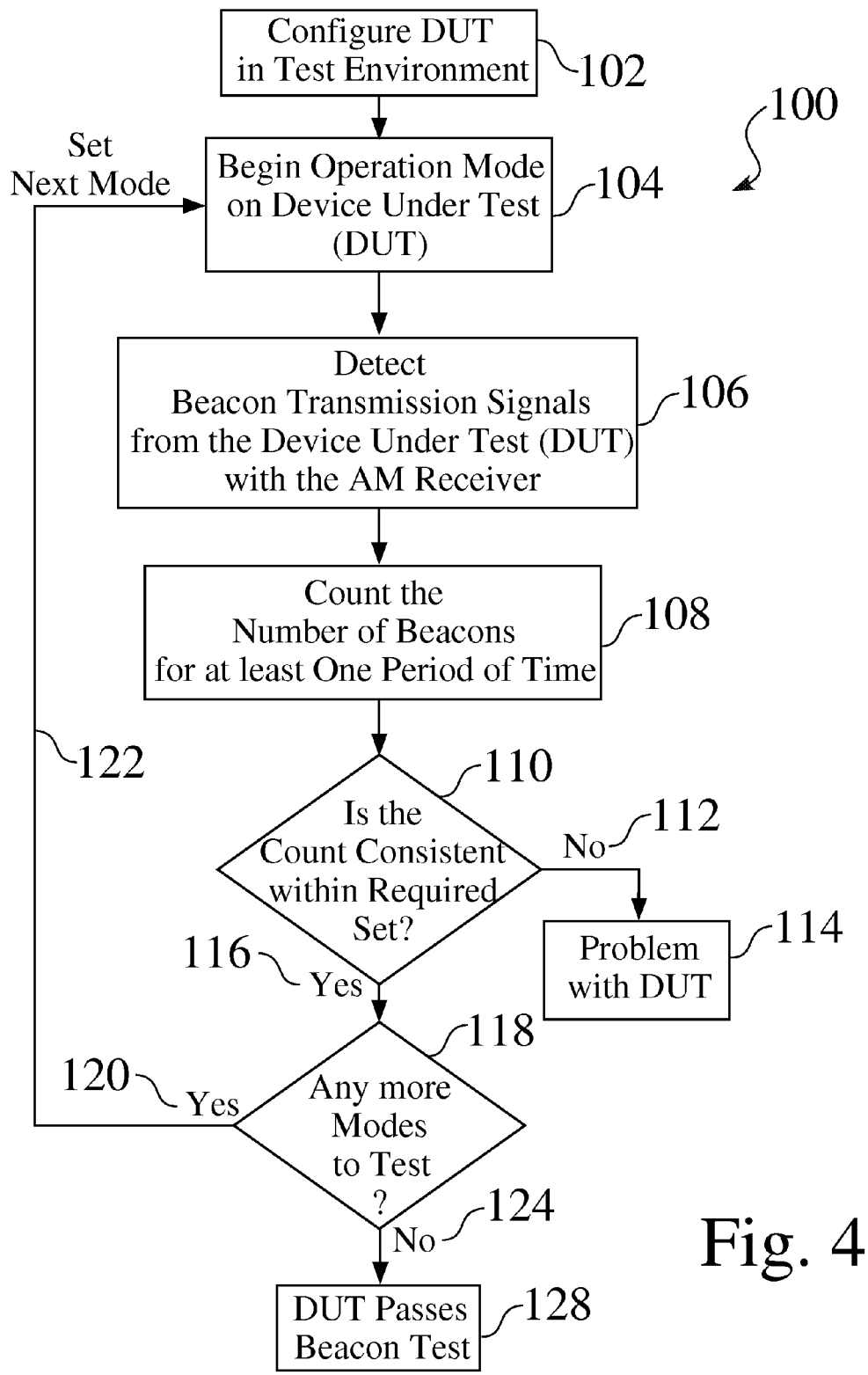
FIG. 4 is a flowchart of an exemplary process for beacon detection for interference testing of a device under test (DUT)

FIG. 4 is a flowchart of an exemplary process 100 for beacon detection for interference testing of a device under test (DUT) 10, such as using the enhanced testing system 50 seen in FIG. 2 and FIG. 3.

Figure 6:
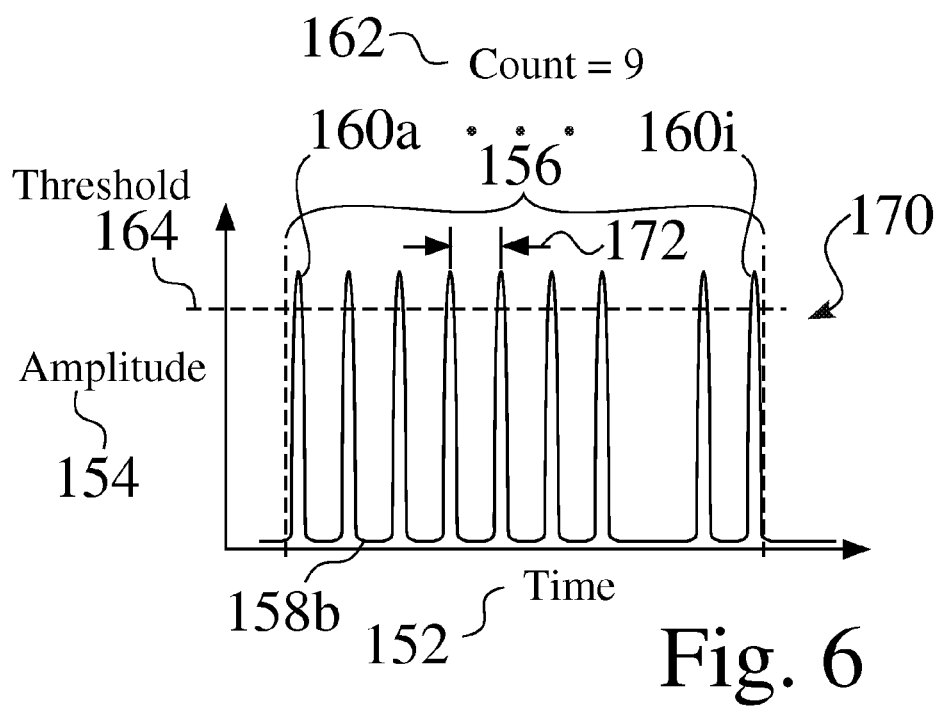
FIG. 6 is a second chart that shows a received wireless transmission from a DUT, and an exemplary beacon count for a time period that is less than an expected count.

In the exemplary process 100 seen in FIG. 4, a device 10 to be tested is placed in proximity to an AM receiver 42, which is configured to receive wireless signals 18, e.g. 18a,18e, sent from the radio modules 14, e.g. 14a,14e. The device under test 10 is then operated 104 at one or more modes. The system 50 receives 106 the incoming beacon signals 160, e.g. 160a-160i (FIG. 5, FIG. 6) from the device under test DUT 10, and the number of beacons 160 are counted 108 for a determined period 156 (FIG. 5, FIG. 6) of time 152 (FIG. 5, FIG. 6).

The system 50 then determines 110 if the count 49,162 of received beacon pulses 160 is consistent with the required set of pulses 160, e.g. 160a-160i, for the time period 156, which is indicative that all signal pulses 160 for a radio band 18 have been received for the time period 156. If the determination 110 is negative 112, e.g. for a period wherein 10 pulses should have properly been counted, and the detected count is less than ten, e.g. from zero to nine (FIG. 6), the system 10 determines that there may be an interference problem with the device under test 10. For example, a loss of one or more beacon pulses 160 in a count 162 may indicate that interference from one or more other radio modules 14 in the device under test 10 has resulted in the failure of the received transmission signal 158, e.g. 158b (FIG. 6).

As also seen in FIG. 4, if the determination 110 is positive 116, the system 50 may log that all signal pulses 160, e.g. 160a-160i, for a radio band have been received for the time period 156, and, if other frequencies 118 need to be tested 120, the process may preferably return 122, for the next mode of DUT operation, and proceed to test other operation modes.

If there are no more DUT operation modes to test 124, i.e. if the device under test 10 has passed all modes of beacon detection, the system 50 may provide an output 128 or otherwise provide a display and/or signal that indicates the positive result.

FIG. 5 is a first chart 150 that shows an exemplary beacon count 162 within a time period 156, wherein the count 162 is consistent with an expected count 162. FIG. 6 is a second chart 170 that shows an exemplary beacon count 162 within a time period 156, wherein the count is less than an expected count 162. As seen in FIG. 5 and FIG. 6, a signal 158, e.g. 158a,158b, which is received through the AM receiver 42 (FIG. 2, FIG. 3), varies in amplitude 154 as a function of time 152, such as corresponding to a series of beacon intervals 172 (FIG. 6). The received wireless signals 158 define a series of peaks, i.e. beacons 160, which meet and/or exceed a threshold level 164. One or more of the beacons 160, e.g. 160h (FIG. 6), from a single wireless signal 18, e.g. such as but not limited to a Wi-Fi signal 18e (FIG. 2), may be altered, corrupted, or substantially cancelled, by interference 20 from a different wireless signal 18, e.g. such as but not limited to a cable modem signal 18a (FIG. 2). For example, sub-harmonic or harmonic frequencies from a cable modem radio 14a may land upon the Wi-Fi band 18e (FIG. 2), e.g. such as but not limited to 2.4 gigahertz or 5 gigahertz frequencies.

In an exemplary embodiment of a wireless device 10, having a cable modem module 14a, and a Wi-Fi radio module 14e, and exemplary time period 156 may comprise 100 milliseconds, wherein a wireless signal 18e from the Wi-Fi radio module 16e may transmit ten beacons 106, e.g. 106a-106i, within the 100 millisecond period 156. The stored, i.e. expected beacon value 52 (FIG. 2) for such a signal 16e, without interference 20, may therefore correspond to a value of ten for the 100 millisecond period 156. Similarly, an equivalent value may be provided for a different chosen period 156. In the above example, the stored, i.e. expected beacon value 52 (FIG. 2) for such a signal 18e, without interference 20, may therefore correspond to a value of fifty for a 500 millisecond period 156.

The beacon level detection for interference structure 40, system 50, and process 100 provides a significant improvement in for design and development of wireless devices 10, without the need to integrate more complex waveform analysis software and hardware. The testing of wireless configurations may readily be performed, and changes in performance between different configurations may be efficiently tested.

Figure 7:
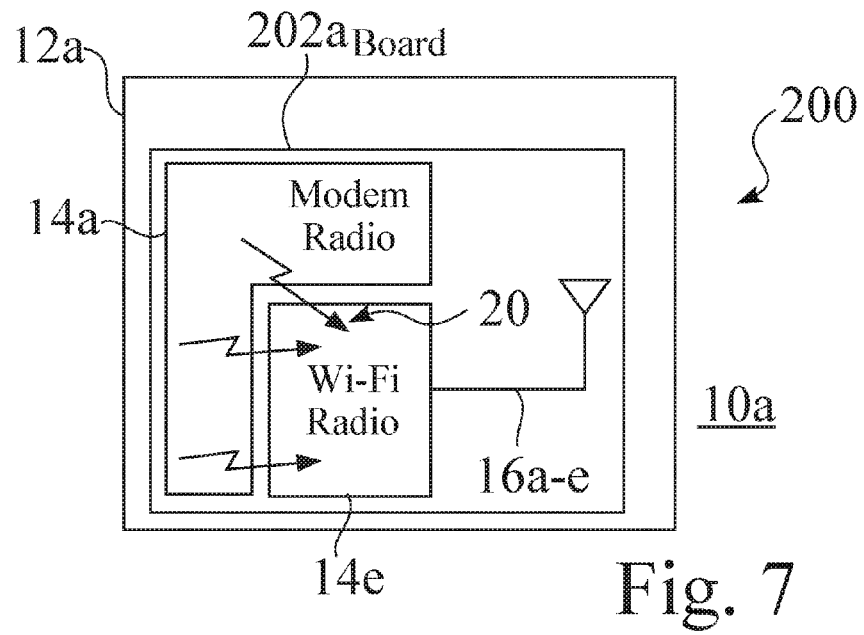
FIG. 7 is a schematic view of a first board layout for a wireless device.
Figure 8:
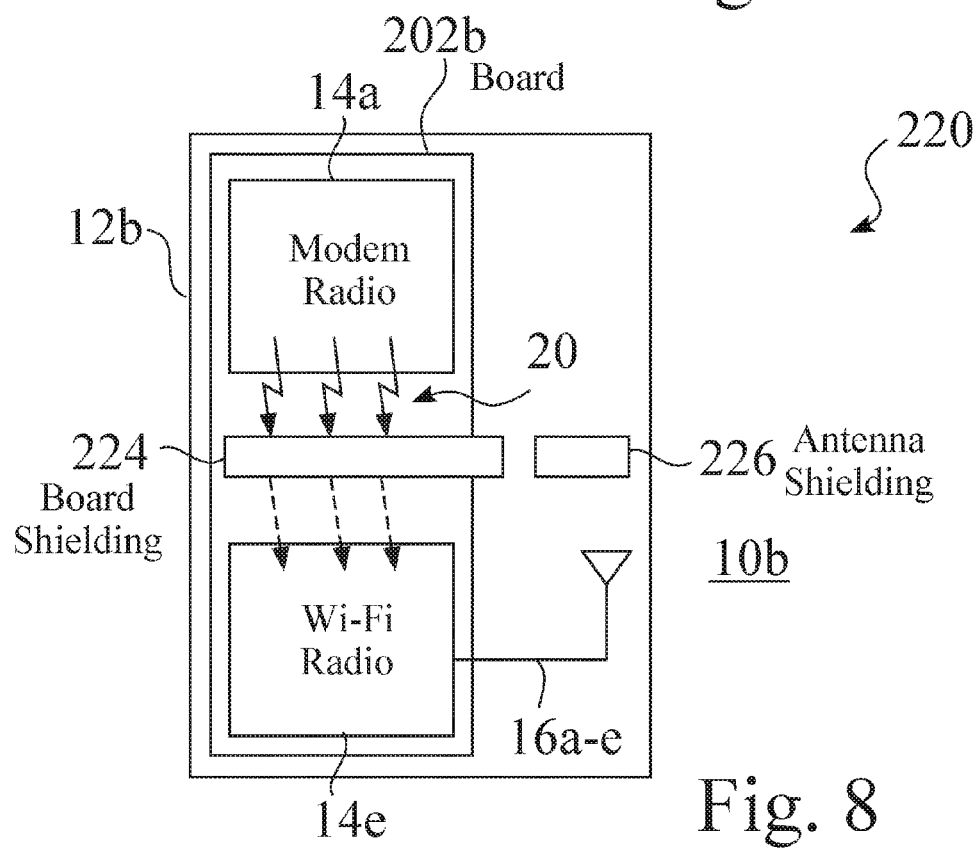
FIG. 8 is a schematic view of a modified board layout for a wireless device.

For example, FIG. 7 is a schematic view 200 of a first board layout for a wireless device 10a. Testing 100 of such a wireless device 10a may indicate 114 (FIG. 4) a potential interference problem during one or more operation mode 104 (FIG. 4). An alternate wireless device 10, e.g. 10b (FIG. 8) may also be tested for possible interference 120. For example, FIG. 8 is a schematic view 220 of a modified board layout for a wireless device 10b, which may comprise one or more differences as compared to the configuration of the wireless device 10a seen in FIG. 7, such as comprising any of:

a difference in board layout 202, e.g. 202a,202b;
a difference between antenna designs or location 16;
on-board shielding 224;
other shielding 226;
cable routing;
enclosure design or configuration 12, e.g. 12a,12b;
operational modes; and/or
other parameters.

The design of the second device 10b may be considered at any time, such as to provide a comparative development prototype concurrently with the first device 10a, or as developed later, as a result of the testing 100 and detected interference 114 of the first device 10a.

Figure 9:
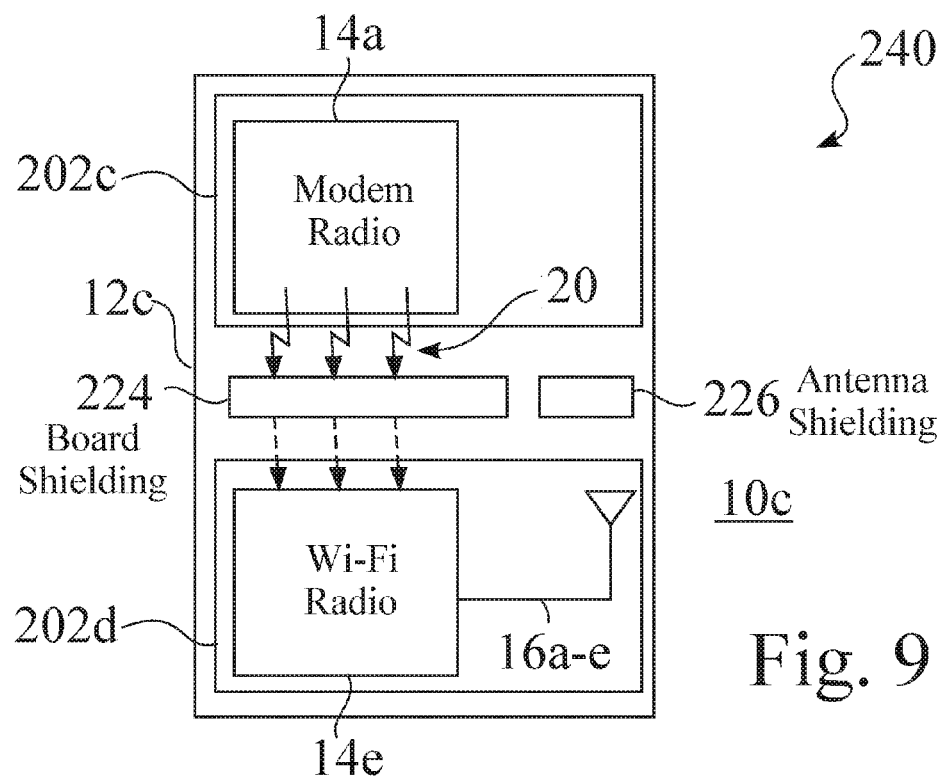
FIG. 9 is a schematic view of a first internal configuration for a wireless device.
Figure 10:
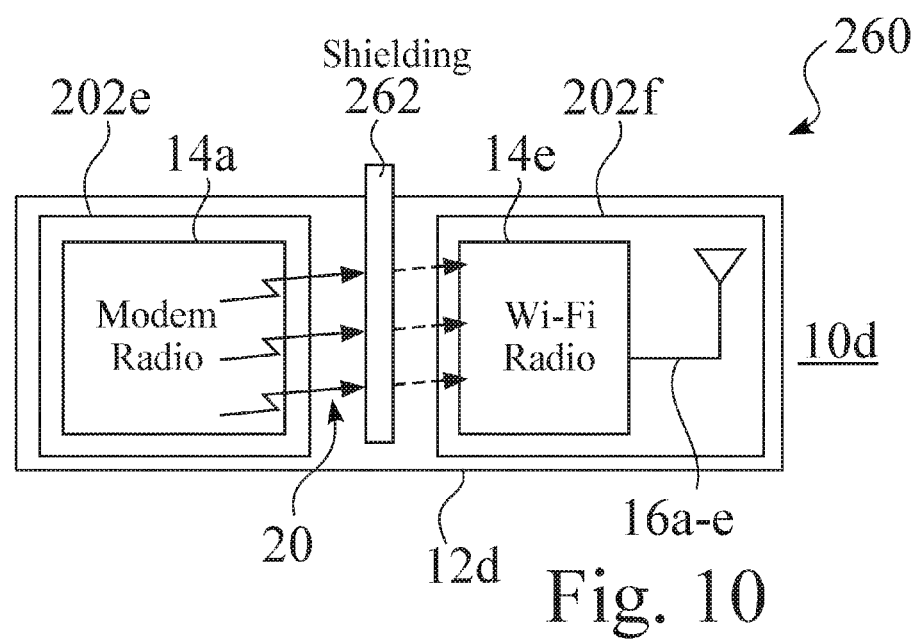
FIG. 10 is a schematic view of a modified internal configuration for a wireless device.

FIG. 9 and FIG. 10 provide further examples of different device configurations 10c and 10d, that may preferably be tested 100 and compared to each other, or to other wireless device configurations 10, e.g. 10a, and 10b. For example, FIG. 9 is a schematic view 240 of the internal configuration for a wireless device 10c, which comprises separate analog signal processing boards (ASPB) 202, e.g. 202c,202d, with shielding 224,226 between boards 202c,202d, and antennas 16a,16e. FIG. 10 is a schematic view 260 of a modified internal configuration for a wireless device 10d, which comprises separate boards 202, e.g. 202e,202f, with alternate shielding 262 between boards 202e,202f, and antennas 16a,16e. As also seen in FIG. 10, the layout of the wireless device 10d may preferably provide a different separation distance between one or more components, such as between the antennas 16a and 16e.

The beacon level detection for interference structure 40, system 50, and process 100 therefore provides a versatile development tool, whereby a large number of potential configurations for wireless devices 10 may readily be tested and evaluated, without the need to integrate complex waveform or spectrum analysis software and hardware. The testing of one or more wireless configurations may readily be performed, to rapidly develop wireless devices 10 that have high efficiency and are easy to manufacture.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A process, comprising the steps of:
receiving, by a receiver, a wireless transmission from a device, the received wireless transmission including a series of beacon pulses;
wherein, the device includes a cable modem radio module and a wireless radio module, the wireless radio module configured to transmit the wireless transmission;
counting, by one or more processors, the beacon pulses associated with the received wireless transmission for at least one period of time;
determining, by the one or more processors, if the count is consistent with an expected count for the at least one period of time; and
generating, by the one or more processors, an output based on the determination.

2. The process of claim 1, wherein the generated output indicates that there is a problem with the device when the count is not consistent with the expected output.

3. The process of claim 1, wherein a consistent count is equal to the expected count.

4. The process of claim 1, wherein when the count is less than the expected count, the determination is negative, and wherein the provided output comprises an indication that there is interference associated with the beacon pulses.

5. The process of claim 1, further comprising the steps of:
modifying the device based upon a generated output that indicates that there is a problem with the device; and
retesting the modified device.

6. The process of claim 5, wherein the modification includes one or more of: modifying a board layout, modifying the location of one or more antenna, modifying the design on one or more antenna, adding shielding, moving shielding, rerouting one or more cables, changing an enclosure, providing an alternate enclosure, changing at least one operation mode, changing one or more components, or changing at least one operation parameter.

7. The process of claim 1, further comprising the steps of:
determining a beacon count value that is consistent with a periodic wireless transmission from the device; and
storing the determined beacon count value within a storage mechanism;
wherein the step of determining if the count is consistent uses the stored determined beacon count value as the expected count.

8. The process of claim 1, further comprising the step of:
presenting, via a display device, the generated output.

9. The process of claim 1, wherein the wireless radio module is a Wi-Fi radio module.

10. The process of claim 9, wherein the Wi-Fi radio module is configured to operate on any of a 2.4 GHz frequency band or a 5.0 GHz frequency band.

11. The process of claim 9, wherein any of a sub-harmonic frequency or a harmonic frequency of the cable modem radio module may land upon the frequency band of the Wi-Fi radio module.

12. The process of claim 9, wherein one or more of the beacon pulses transmitted from the Wi-Fi radio module are reduced or eliminated due to interference from the cable modem radio module.

13. A system for testing a device, the device including a cable modem radio module and a wireless radio module, wherein the wireless radio module is configured to transmit a wireless transmission including a periodic series of beacon pulses, the system comprising:
a receiver configured to receive the wireless transmission from the device;
at least one processor, where the at least one processor is configured to:
count the beacon pulses of the wireless transmission for at least one period of time;
compare the count to an expected count;
determine if the count is consistent with the expected count, and
generate an output that corresponds with the determination; and
a display device configured to present the generated output.

14. The system of claim 13, wherein the generated output includes an indication that there is a problem with the device when the count is not consistent with an expected count.

15. The system of claim 13, wherein a consistent count is equal to the expected count.

16. The system of claim 13, wherein if the count is less than the expected count, the count is determined to be inconsistent with the expected count, and the output indicates that there is interference associated with the wireless transmission.

17. The system of claim 13, further comprising:
a storage;
wherein the at least one processor is configured to
determine a beacon count value that is consistent with a periodic wireless transmission from the device,
store the determined beacon count value within the storage, and
access the stored determined beacon count value as the expected count.

18. The system of claim 13, wherein the wireless radio module is a Wi-Fi radio module configured to operate on any of a 2.4 GHz frequency band or a 5.0 GHz frequency band.

19. The system of claim 13, wherein any of a sub-harmonic frequency or a harmonic frequency of the cable modem radio module may land upon a frequency band of the wireless radio module.

20. The system of claim 13, wherein one or more beacon pulses transmitted from the wireless radio module are reduced or eliminated due to interference from the cable modem radio module.

21. A system for testing a device comprising a cable modem radio module and a wireless radio module, wherein the wireless radio module is configured to transmit a wireless transmission including a periodic series of beacon pulses over a radio band, the system comprising:
means for receiving the wireless transmission from the device;
means for detecting a signal comprising beacon pulses in the received wireless transmission;
means for counting the beacon pulses for at least one period of time;
means for comparing the count of the beacon pulses to an expected count;
means for determining is the count is consistent with the expected count;
means for generating an output that corresponds to the determination; and
means for presenting the generated output to a user.

* * * * *